United States Patent [19]

Hopkins et al.

[11] 4,119,531
[45] Oct. 10, 1978

[54] LARGE-PORE HYDRODEMETALLIZATION CATALYST AND PROCESS EMPLOYING SAME

[75] Inventors: P. Donald Hopkins, St. Charles, Ill.; Albert L. Hensley, Jr., Munster, Ind.

[73] Assignee: Standard Oil Company (Indiana), Chicago, Ill.

[21] Appl. No.: 811,835

[22] Filed: Jun. 30, 1977

[51] Int. Cl.$^2$ .............................................. C10G 17/00
[52] U.S. Cl. ............................... 208/251 H; 252/465; 252/466 PT; 252/466 J
[58] Field of Search .................... 208/251 H; 252/465, 252/466 PT, 466 J

[56] References Cited

U.S. PATENT DOCUMENTS

| | | | |
|---|---|---|---|
| 3,882,049 | 5/1975 | Berolacini et al. | 252/465 |
| 3,898,155 | 8/1975 | Wilson | 208/251 H |
| 3,931,052 | 1/1976 | Oleck et al. | 252/466 J |
| 3,989,645 | 11/1976 | Long et al. | 252/466 J |

*Primary Examiner*—Delbert E. Gantz
*Assistant Examiner*—Joseph A. Boska

*Attorney, Agent, or Firm*—James L. Wilson; Arthur G. Gilkes; William T. McClain

[57] ABSTRACT

There is disclosed a catalyst for the hydrodemetallization of petroleum hydrocarbon streams containing asphaltenes and large quantities of metals. This catalyst consists essentially of a small amount of a single hydrogenation metal selected from the group consisting of metals from Group VIB of the Periodic Table of Elements and metals from Group VIII of the Periodic Table deposed on a large-pore alumina. The hydrogenation metal may be present in the elemental form, as an oxide, as a sulfide, or mixtures thereof. The catalyst is characterized by a surface area of at least 120 square meters per gram, a pore volume of at least 0.7 cc per gram, and an average pore diameter of at least 125 Angstrom units. Suitable examples of a hydrogenation metal are nickel and molybdenum.

Also disclosed is a process for the hydrodemetallization of a hydrocarbon stream containing asphaltenes and a substantial amount of metals, which process comprises contacting said hydrocarbon stream in a reaction zone under suitable operating conditions and in the presence of hydrogen with the catalyst described hereinabove.

6 Claims, 2 Drawing Figures

LARGE-PORE HYDRODEMETALLIZATION CATALYST AND PROCESS EMPLOYING SAME

BACKGROUND OF THE INVENTION

It is widely known that various organometallic compounds and asphaltenes are present in petroleum crude oils and other heavy hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature removal from the particular reactor and replacement by new catalyst.

Various materials have been employed in the treatment of petroleum hydrocarbon streams for the removal or substantial reduction of the metals, as well as asphaltenes, contained therein. For example, such treatment may have been conducted with bauxite (U.S. Pat. No. 2,687,985 and 2,769,758); a material consisting essentially of titania and alumina (U.S. Pat. No. 2,730,487); a material consisting essentially of iron oxide and alumina (U.S. Pat. No. 2,764,525); fresh or spent bauxite, activated carbon, artificial and synthetic clays, and silica-alumina materials (U.S. Pat. No. 2,771,401); and a porous alumina having extensive macroporosity, the latter being in an ebullated bed (U.S. Pat. No. 3,901,792).

Hydrogenation, hydrodesulfurization, hydrodenitrogenation, and/or demetallization catalysts containing at least one metal from Group VI of the Periodic Table of Elements and at least one metal from Group VIII of the Periodic Table of Elements on a solid porous refractory inorganic oxide material are known (U.S. Pat. Nos. 3,649,526; 3,668,116; 3,814,683; 3,876,680; 3,114,701; and 3,960,712). In some cases, the catalyst may be a large-pore, high-surface area catalyst (U.S. Pat. Nos. 3,730,879; 3,684,688; 3,393,148; 3,898,155; and 3,902,991). There are also disclosed catalysts which may have one or more metals from Group VI and Group VIII of the Periodic Table of Elements on a support, such as alumina (U.S. Pat. Nos. 3,297,588; 3,712,861; 3,891,541; and 3,931,052). In addition, catalysts containing one or more metals from Group VI and Group VIII on a support, such as alumina, and having large pores and a high surface area have been disclosed (U.S. Pat. Nos. 3,876,523; 3,928,176; 3,977,961; 3,985,684; 3,989,645; 3,993,598; 3,993,599; and 3,993,601). However, not one of the references teaching these latter catalysts discloses that only a small amount of the hydrogenation metal is to be used. The catalyst may contain from about 5 to about 50 wt.% Group VI metal and about 1 to about 12 wt.%, preferably, about 4 to about 8 wt.% Group VIII metal. No actual examples of catalysts containing only one metal and having that metal present in an amount of less than 4 wt.% were presented.

In addition, there has been disclosed in a vague manner a hydrodesulfurization catalyst containing at least 4 wt.%, preferably 8 to 25 wt.%, based on the total catalyst and calculated as the metal, of a Group VI component and an alumina gel. The catalyst may have large pores and a high surface area and may also contain from 1 to 10 wt.% of a Group VIII component, based on the total catalyst weight and calculated as the metal. If only one hydrogenation metal is present, it must be present in an amount of at least 4 wt.%, calculated as the metal. None of the catalysts in the examples contained only one metal. Furthermore, the catalyst is not considered for demetallization (U.S. Pat. No. 3,577,353).

There has now been found and developed a catalyst that is suitable for the hydrodemetallization of hydrocarbon streams, which catalyst contains only one hydrogenation metal in a relatively small amount deposed on a large-pore alumina. The catalyst has special physical characteristics.

SUMMARY OF THE INVENTION

Broadly, according to the present invention, there is provided a catalyst for the catalytic hydrodemetallization of hydrocarbons, which catalyst consists essentially of a small amount of a single active original hydrogenation metal selected from the group consisting of metals of Group VIB of the Periodic Table of Elements and metals of Group VIII of the Periodic Table of Elements deposed on a large-pore alumina. The hydrogenation metal may be present in the elemental form, as an oxide, as a sulfide, or mixtures thereof. The catalyst has a surface area of at least 120 m$^2$/gm, a pore volume of at least 0.7 cc/gm, and an average pore diameter of at least 125 Angstrom units (Å). Typically, the hydrogenation metal may be nickel or molybdenum. Such metal may be present in an amount within the range of about 0.5 wt.% to about 3 wt.%, based upon the total catalyst weight and calculated as the respective oxide.

There is also provided a process for the hydrodemetallization of a hydrocarbon feedstock containing asphaltenes and a substantial amount of metals, which process comprises contacting said feedstock in a reaction zone under suitable operating conditions and in the presence of hydrogen with the above catalyst. Suitable operating conditions comprise a temperature of about 700° F. to about 900° F., a hydrogen partial pressure of about 500 psia to about 3,000 psia, a hydrogen flow rate of about 1,000 standard cubic feet of hydrogen per barrel of hydrocarbon (SCFB) to about 10,000 SCFB, and a liquid hourly space velocity (LHSV) of about 0.2 to about 2.5 volumes of hydrocarbon per hour per volume of catalyst.

BRIEF DESCRIPTION OF ACCOMPANYING DRAWINGS

The accompanying FIG. 1 presents a comparison of catalyst costs for desulfurizing feeds with increasing metals content with a conventional or regular resid desulfurization catalyst and with a two-catalyst system employing the demetallization catalyst of the present invention as the first catalyst.

The accompanying FIG. 2 presents the amount of demetallization of a Jobo residuum provided by two embodiments of the catalyst of the present invention and compares such demetallization to that provided by a prior art demetallization catalyst comprising two hydrogenation metals.

DETAILED DESCRIPTION OF THE INVENTION

Figure 1:
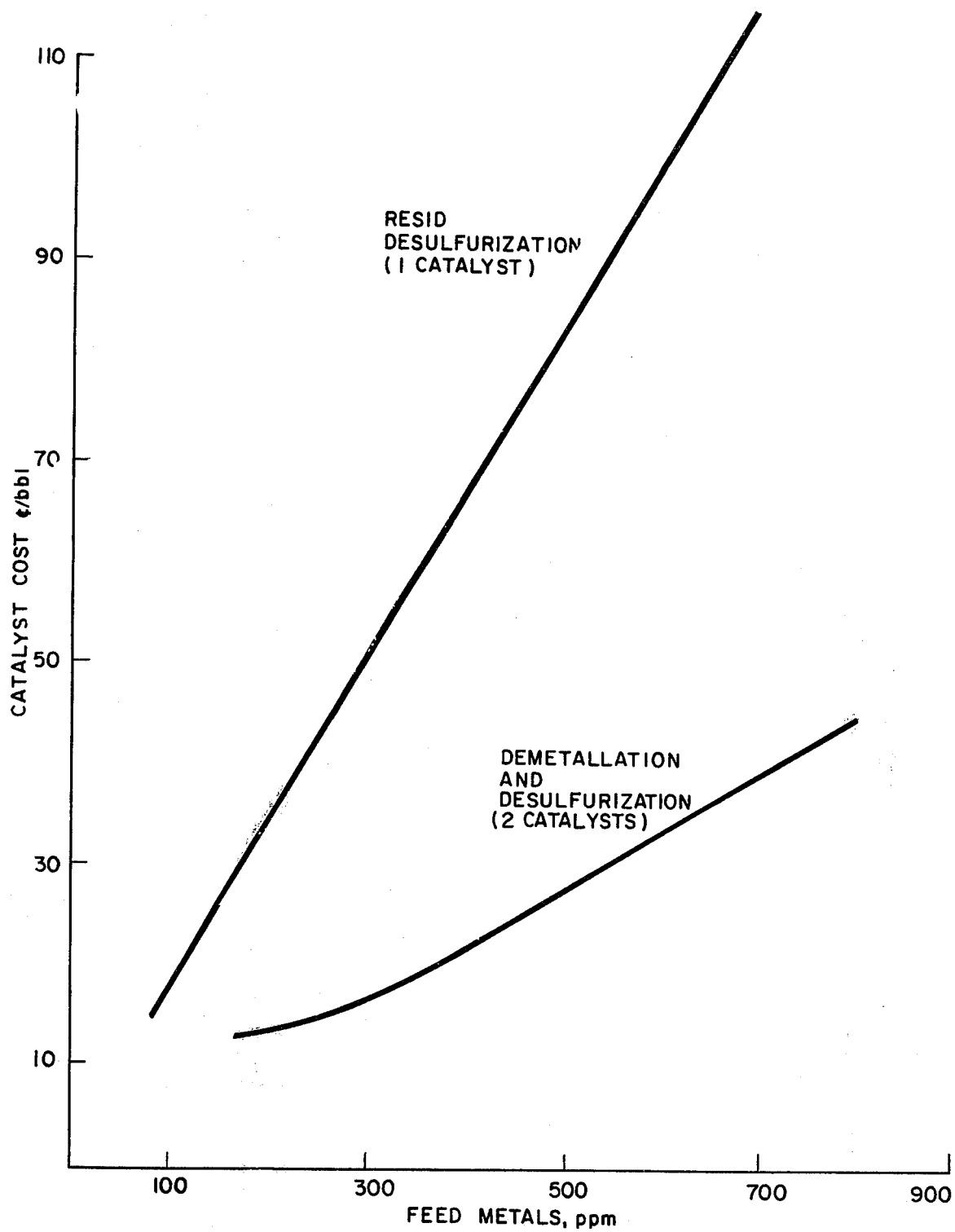

The present invention includes a novel catalyst for the hydrodemetallization of hydrocarbon feedstocks containing asphaltenes and a substantial amount of metals and to a process for the removal of metals, which process employs the catalyst. Such catalyst and process should effectively demetallize various heavy hydrocarbon feedstocks. Typical feedstocks that may be treated satisfactorily by the catalyst and process of the present invention may contain a substantial amount of components that boil appreciably above 1,000° F. They may contain metals in an amount that is greater than 1,000 ppm and asphaltenes in an amount that is as great as 25 wt.% asphaltenes. Examples of such feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

Iron may be present in the form of soluble organometallic compounds, such as are present frequently in various Western United States crude oils and residuum fractions. The presence of such iron porphyrin complexes and other iron organometallic complexes causes severe difficulties in the refining and utilization of heavy hydrocarbon fractions, even if the concentration of such complexes is relatively small. It is known that a cracking catalyst deteriorates rapidly and its selectivity changes when in the presence of an appreciable quantity of the organometallic iron compounds. An appreciable quantity of such organometallic iron compounds in feedstocks that are being hydrotreated or hydrocracked harmfully affects such processes. The catalyst becomes deactivated and plugging or increasing of the pressure drop in a fixed-bed reactor results from the deposition of iron compounds in the interstices between catalyst particles.

Nickel-containing compounds and vanadium-containing compounds are present in practically all crude oils that are associated with the high Conradson carbon asphaltic and/or asphaltenic portion of the crude. Of course, such metals are concentrated in the residual bottoms, when a crude is topped to remove those fractions that boil below about 450° F. to 600° F. If such residuum is treated by additional processes, the presence of such metals adversely affects the catalyst in such processes, It should be pointed out that nickel-containing compounds deleteriously affect cracking catalysts to a greater extent than do iron-containing compounds. If an oil containing such metals is used as a fuel, the metals will cause poor fuel oil performance in industrial furnaces, since they corrode the metal surfaces of the furnaces.

While metallic contaminants, such as vanadium, nickel, and iron, may be present in various petroleum hydrocarbon streams in rather small amounts, they are often found in concentrations in excess of 40 to 50 parts per million (ppm) by weight. Of course, other metals may also be present in a particular hydrocarbon stream. Such metals may exist as the oxides or sulfides of the particular metal, or they may be present as a soluble salt of the particular metal, or they may be present as high molecular weight organometallic compounds, including metal naphthenates and metal porphyrins, and derivatives thereof.

Broadly, according to the present invention, there is provided a catalyst for the catalytic hydrodemetallization of hydrocarbons. This catalyst consists essentially of a small amount of a single active original hydrogenation metal deposed on a large-pore, high-surface area alumina, said hydrogenation metal being present in the elemental form, as an oxide, as a sulfide, or mixtures thereof, and said catalyst having a surface area of 120 $m^2/gm$ to about 400 $m^2/gm$, a pore volume of 0.7 cc/gm to about 1.5 cc/gm, and an average pore diameter of 125 Å to about 350 Å. The term "single active original hydrogenation metal" is used herein to refer to only the one hydrogenation metal that is incorporated into the catalyst during its preparation and does not include any metal that is deposited upon the catalyst during the use of the catalyst in any process.

The catalyst of the present invention comprises a hydrogenation component and a large-pore, high-surface area alumina support. The hydrogenation component of this novel catalyst comprises only one metal, which metal may be present as the element, as an oxide thereof, as a sulfide thereof, or mixtures thereof. The metal is typically selected from either Group VIB of the Periodic Table of Elements or Group VIII of the Periodic Table of Elements. The Periodic Table of Elements referred to herein is found on page 628 of WEBSTER'S SEVENTH NEW COLLEGIATE DICTIONARY, G. & C. Merriam Company, Springfield, Massachusetts, U.S.A. (1965). A preferred metal from Group VIB is molybdenum, while a preferred metal from Group VIII is nickel. The hydrogenation metal will be present in the catalyst in an amount within the range of about 0.5 wt.% to about 3 wt.%, calculated as the oxide of the respective metal and based upon the total catalyst weight. Preferably, the metal should be present in an amount of about 1 wt.% to about 2 wt.%, based upon the total catalyst weight and calculated as the oxide of that particular metal.

The support material of the catalyst of the present invention is a large-pore, high-surface area alumina which has a surface area of at least 120 $m^2/gm$, a pore volume of at least 0.7 cc/gm, and an average pore diameter of at least 125 Å. Such aluminas should be characterized by a surface area ranging from about 120 $m^2/gm$ to about 400 $m^2/gm$, a pore volume within the range of about 0.7 cc/gm to about 1.5 cc/gm, and an average pore diameter of about 125 Å to about 350 Å and can be obtained commercially. An example is a KSA Light alumina manufactured by Kaiser Chemicals, a Division of the Kaiser Aluminum and Chemicals Corporation.

The catalyst of the present invention may be prepared by the typical commercially available method of impregnating an appropriate alumina with a solution containing a heat-decomposable compound of the metal to be placed on the catalyst, drying, and calcining the impregnated material. The drying may be conducted in air at a temperature of 150° F. to about 400° F. for a period of 1 to 16 hours. Typically, the calcination can be carried out at a temperature of about 800° F. to about 1,200° F. for a period of from 0.5 to 8 hours. Water is a typical solvent for the impregnation solution. The alumina may have been calcined prior to the impregnation.

Only a small amount of the hydrogenation metal is incorporated into the catalyst. The impregnation of only a small amount of the hydrogenation metal does not appreciably affect the physical properties of the alumina. Hence, the catalyst of the present invention has a surface area of 120 $m^2/gm$ to about 400 $m^2/gm$, a pore volume of 0.7 cc/gm to about 1.5 cc/gm, and an average pore diameter of 125 Å to about 350 Å.

The catalyst may be employed in the form of a fixed-bed or an ebullated bed of particles. In the case of a fixed-bed, the particulate material should have a particle size of at least 1/32 inch.

An advantage of the catalyst of the present invention is its low cost and cheap method of preparation. Large-pore, high-surface area alumina is commercially available. Such alumina is relatively inexpensive and can be impregnated with a small amount of hydrogenation metal without appreciable change in the surface properties of the alumina. The resulting catalyst possesses high capacity for metals removal from the feedstock being treated.

The accompanying FIG. 1 presents a comparison of catalyst costs for desulfurizing feeds with increasing metals content with a conventional or regular resid desulfurization catalyst and with a two-catalyst system where about 70% of the metals are deposited on an embodiment of the low-cost, large-pore, high-surface area demetallization catalyst of the present invention as a first catalyst. Such reduced catalyst cost results both from the higher capacity and the low cost of the demetallization catalyst.

According to the invention, there is provided a process for the hydrodemetallization of feedstocks containing asphaltenes and a substantial amount of metals, which process comprises contacting the feedstock in a reaction zone under suitable operating conditions and in the presence of hydrogen with the catalyst described hereinabove. The term "substantial amount of metals" as used herein refers to any amount that is 3 ppm or greater and may be as large as 1,000 ppm or more. Suitable operating conditions for this demetallization process comprise a temperature of about 700° F. to about 900° F., a hydrogen partial pressure of about 500 psia to about 3,000 psia, a hydrogen flow rate of about 1,000 SCFB to about 10,000 SCFB, and a LHSV of about 0.2 to about 2.5 volumes of hydrocarbon per hour per volume of catalyst.

The following examples are presented to facilitate a better understanding of the present invention. They are presented for the purpose of illustration only and are not intended to limit the scope of the present invention.

EXAMPLE I

An embodiment of the hydrodemetallization catalyst of the present invention was prepared. The support material was a KSA Light alumina obtained from Kaiser Chemicals, a Division of the Kaiser Aluminum and Chemicals Corporation. It was made into the form of ⅛-inch extrudates and was calcined in this form in static air at a temperature of 1,000° F. for a period of time of about 1 to 2 hours. The calcined extrudates were then ground to a 14- to-20-mesh material.

A solution of ammonium paramolybdate was prepared by dissolving 120 gm of $(NH_4)_6Mo_7O_{24} \cdot 4H_2O$ in 250 ml of concentrated ammonium hydroxide. The resulting solution was diluted subsequently with distilled water to make 500 ml of solution. A 1-ml portion of the solution contained the equivalent of 0.20 gm of $MoO_3$. An 11-ml portion of the above-prepared solution was diluted to 250 ml with distilled water and the resultant aqueous solution was added to 219 gm (500 cc) of the 14-to-20-mesh alumina. This amount of solution just wetted all of the alumina. The impregnated alumina was then calcined in static air at a temperature of 1,000° F. for a period of 1½ hours. The finished catalyst, hereinafter identified as Catalyst A, was found to have a surface area of 198 $m^2/gm$ and to contain 1.22 wt.% $MoO_3$, based upon the total catalyst weight.

EXAMPLE II

Another embodiment of the catalyst of the present invention was prepared.

Another portion of KSA Light alumina was calcined as described in Example I and was then impregnated with a solution containing nickel. This solution was prepared by dissolving 3.9 gm of $Ni(NO_3)_2 \cdot 6H_2O$ in 200 ml of distilled water. This was equivalent to 1.0 gm of NiO. The entire solution was then added to 100 gm of the KSA Light alumina powder and an additional 40 ml of distilled water was added to the resulting mixture to make the alumina entirely wet and soupy. After thorough mixing, the product was dried in a vacuum at 212° F. for about 16 hours, formed into ⅛-inch diameter pills, and calcined at 1,000° F. for a period of 4 hours. This calcination was performed in static air. The impregnated catalyst was then ground to a 14-to-20-mesh material. The catalyst, hereinafter identified as Catalyst B, was prepared to contain 1.0 wt.% NiO, based on the total catalyst weight.

EXAMPLE III

A catalyst containing both cobalt and molybdenum on a large-pore alumina was prepared. The alumina was another portion of the KSA Light alumina that was employed in the preparation of Catalyst A and Catalyst B.

A solution containing both cobalt and molybdenum compounds was prepared by dissolving 9.28 gm of ammonium paramolybdate and 8.22 gm of cobalt nitrate hexahydrate in 150 ml of distilled water. This solution was used subsequently to impregnate 50 gm of the large-pore alumina. The impregnated alumina was dried at 212° F. in a vacuum oven overnight and calcined at 1,000° F. in static air for 1 hour. It was prepared to contain 3.7 wt.% CoO and 13.3 wt.% $MoO_3$, based upon the total catalyst weight. This catalyst is hereinafter identified as Catalyst C.

The physical properties of the aforesaid three catalysts, as well as those of a calcined extrudate of the KSA Light alumina that was employed as the support of each, are presented hereinbelow in Table I.

Table I

| Material KSA Light | SURFACE PROPERTIES | | |
|---|---|---|---|
| | Surface Area, $m^2/gm$ | Pore Volume, cc/gm | Avg. Pore Diameter, Å |
| $Al_2O_3$ | 198 | 1.01 | 205 |
| Catalyst A | 186 | .90 | 195 |
| Catalyst B | 266 | 1.00 | 151 |
| Catalyst C | 206 | 0.71 | 138 |

EXAMPLE IV

The above three catalysts were tested for their ability to remove metals from two Jobo II resids, identified as Feed No. 1 and Feed No. 2. Properties of these feedstocks are listed hereinafter in Table II.

Table II

| FEED PROPERTIES | | | |
|---|---|---|---|
| Feed No. | 1 | 2 | 3 |
| Metals, ppm | | | |
| V | 460 | 560 | 265 |
| Ni | 100 | 135 | 100 |
| Fe | 11 | 67 | |
| Gravity, ° API | 9.4 | 6.6 | 3.9 |
| Sulfur, wt. % | 3.70 | 4.52 | 6.0 |
| Nitrogen, wt. % | 0.62 | 1.19 | 0.62 |
| Hydrogen, wt. % | 10.38 | 10.22 | 9.98 |
| Carbon, wt. % | 84.66 | 84.07 | 82.98 |
| Asphaltenes, wt. % | 7.9 | 10.7 | 12.0 |
| 1,000° F.-fraction, wt. % | 40.5 | 31.1 | 32.0 |

Each test was conducted in a bench-scale test unit having automatic controls for pressure, flow of reactants, and temperature. The reactor was made from ⅜-inch inside diameter stainless steel heavy-walled tubing. A ⅛-inch-outside-diameter thermowell extended up through the center of the reactor. The reactor was heated by an electrically heated steel block. The hydrocarbon feedstock was fed to the unit by means of a Ruska pump, a positive displacement pump. The catalyst was present in the reactor in the form of a bed of 14-to-20-mesh material having an approximate bed length of 7 to 10 inches and was supported on 10-to-14-mesh alundum particles. In all cases, from 11 to 16 cc of catalyst was employed as the catalyst bed. A layer of 10-to-14-mesh alundum particles approximately 2 inches in length was placed over the catalyst bed in the reactor. The catalyst was located in the annular space between the thermowell and the internal wall of the ⅜-inch-inside-diameter reactor. Hydrocarbon feed and hydrogen were introduced into the reaction zone. The effluent from the reaction zone was passed into a liquid-gas separator. The liquid was passed through a pressure control valve and was collected in a liquid product receiver, while the gas was passed through a pressure control valve and then through a wet test meter to an appropriate vent.

The operating conditions that were employed for testing the catalysts are presented in Table III hereinafter.

TABLE III

| | | | TEST CONDITIONS | | | | | | |
|---|---|---|---|---|---|---|---|---|---|
| | | | Catalyst Loaded | | Temp., | Press., | | Feed Rates | |
| Run | Catalyst | Feed | Vol., cc | Wt., gm | ° F. | psig | LHSV | Oil, cc/hr. | Hydrogen, SCFB |
| 1 | A | 1 | 14.4 | 7.58 | 780 | 1,800 | 1 | 14.4 | 5,000 |
| 2 | (A)<br>(B) | B | 2 | 11.5 | 3.89 | 800 | 1,400 | 1 | 11.5 | 9,200 |
| | | | | | | | 2 | 23.0 | 4,400 |
| 3 | C | 1 | 16 | 8.8 | 780 | 1,800 | 1 | 16.0 | 8,000 |

Figure 2:
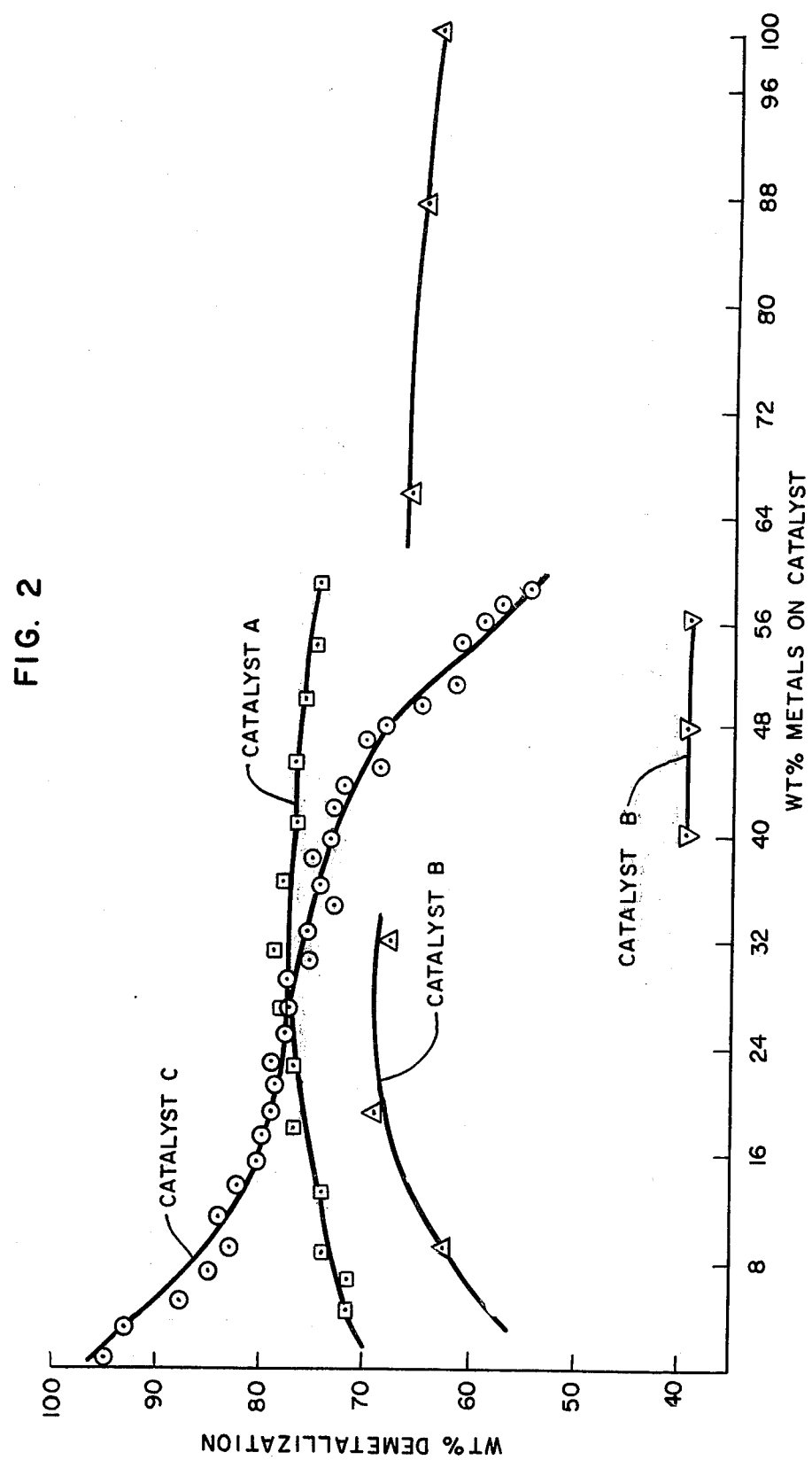

Activity data obtained from these three tests are presented in the accompanying FIG. 2. Activity is expressed as the percent vanadium and nickel removed from the feed being tested and this activity is plotted in the figure versus the metals on the catalyst, defined as the percent of the original catalyst weight.

Test No. 2 was carried out at two sets of conditions. The data in FIG. 2 show that at the greater LHSV, as represented by the three points below 40 wt.% demetallization, a greatly reduced amount of demetallization was obtained.

The results of these tests show that considerable activity is provided by Catalyst A and Catalyst B, which are embodiments of the catalyst of the present invention. In fact, the activity for demetallization for each of these catalysts increases somewhat in the early stages of the run. Furthermore, Catalyst C provided an initial activity which was superior to those provided by Catalyst A and Catalyst B. However, the activity decline shown by Catalyst C is much greater than the declines provided by Catalysts A and B, so that by the time 50 wt.% metals have been deposited on each of the catalysts, Catalyst C provides less demetallization activity than those of Catalyst A and Catalyst B at similar space velocities.

The tests made with Catalyst A and Catalyst B represent embodiments of the process of the present invention. They demonstrate that such a process is suitable for the hydrodemetallization of heavy hydrocarbon streams, particularly, a petroleum hydrocarbon residuum.

EXAMPLE V

A catalyst similar to Catalyst A and prepared in a manner similar to that employed to prepare Catalyst A was used to demetallize a tar sands atmospheric resid. This catalyst, identified as Catalyst D, was prepared to contain 1 wt.% $MoO_3$. Catalyst D had a surface area of 225 $m^2$/gm, a pore volume of 0.95 cc/gm, and an average pore diameter of 168 Å. Properties of the feedstock, Feed No. 3, are listed in Table II hereinabove.

Catalyst D was tested in a unit as described hereinabove at a temperature of 770° F. or 790° F. and a LHSV of 1 or 2. At a temperature of 770° F. and a LHSV of 2, 28.5 wt.% demetallization occurred, accompanied by 39% desulfurization, 25.2% conversion of 1,000° F.+ material, and 0.69 wt.% (on feed) $C_1$-$C_4$ gas make. When the LHSV was decreased to 1.0, 60.8% demetallization, 44.0% conversion of 1,000° F.+ material, 459 SCFB hydrogen consumption, and 1.19 wt.% (on feed) $C_1$-$C_4$ gas make occurred. When the temperature was increased to 790° F. at a LHSV of 1.0, 69.0% demetallization, 52.0% conversion of 1,000° F.+ material, 48.0% desulfurization, 1.86 wt.% (on feed) $C_1$-$C_4$ gas make, and 570 SCFB hydrogen consumption resulted.

This test demonstrates that the catalyst and process of the present invention may be used to demetallize a tar-sands-derived heavy hydrocarbon stream.

What is claimed is:

1. A catalyst for the catalytic hydrodemetallization of hydrocarbon streams, which catalyst consists essentially of a small amount of a single active original hydrogenation metal deposed on a large-pore, high-surface area alumina, said hydrogenation metal being a member of Group VIB of the Periodic Table of Elements and being present in the elemental form, as an oxide, as a sulfide, or mixtures thereof, said member of Group VIB of the Periodic Table of Elements being present in an amount within the range of about 0.5 wt.% to about 3 wt.%, based upon the total catalyst weight and calculated as the oxide, and said catalyst having a surface area of 120 $m^2$/gm to about 400 $m^2$/gm, a pore volume of 0.7 cc/gm to about 1.5 cc/gm, and an average pore diameter of 125 Å to about 350 Å.

2. The catalyst of claim 1 wherein said member of Group VIB is molybdenum.

3. A process for the hydrodemetallization of a hydrocarbon feedstock containing asphaltenes and a substantial amount of metals, said feedstock being a member selected from the group consisting of crude oils, topped crude oils, petroleum hydrocarbon residua, oils obtained from tar sands, residua derived from tar sand oil, and hydrocarbon streams derived from coal, which process comprises contacting said feedstock in a reaction zone under suitable operating conditions and in the presence of hydrogen with the catalyst of claim 2.

4. The process of claim 3 wherein said conditions comprise a temperature of about 700° F. to about 900° F., a hydrogen partial pressure of about 500 psia to about 3,000 psia, a hydrogen flow rate of about 1,000 SCFB to about 10,000 SCFB, and a LHSV of about 0.2 to about 2.5 volumes of hydrocarbon per hour per volume of catalyst.

5. A process for the hydrodemetallization of a hydrocarbon feedstock containing asphaltenes and a substantial amount of metals, said feedstock being a member selected from the group consisting of crude oils, topped crude oils, petroleum hydrocarbon residua, oils obtained from tar sands, residua derived from tar sand oil, and hydrocarbon streams derived from coal, which process comprises contacting said feedstock in a reaction zone under suitable operating conditions and in the presence of hydrogen with the catalyst of claim 1.

6. The process of claim 5 wherein said conditions comprise a temperature of about 700° F. to about 900° F., a hydrogen partial pressure of about 500 psia to about 3,000 psia, a hydrogen flow rate of about 1,000 SCFB to about 10,000 SCFB, and a LHSV of about 0.2 to about 2.5 volumes of hydrocarbon per hour per volume of catalyst.

* * * * *

UNITED STATES PATENT OFFICE
CERTIFICATE OF CORRECTION

Patent No. 4,119,531          Dated   October 10, 1978

Inventor(s)  P. DONALD HOPKINS AND ALBERT L. HENSLEY, JR.

It is certified that error appears in the above-identified patent and that said Letters Patent are hereby corrected as shown below:

Column 3, line 57, "processes, It" should be -- processes. It --

Column 6, line 59, "A" should be -- $\overset{\circ}{A}$ --

Signed and Sealed this

Twenty-fifth Day of March 1980

[SEAL]

Attest:

SIDNEY A. DIAMOND

Attesting Officer    Commissioner of Patents and Trademarks